(12) United States Patent
Hsu et al.

(10) Patent No.: US 6,280,696 B1
(45) Date of Patent: Aug. 28, 2001

(54) METHOD AND APPARATUS FOR REMOVING HIGH BOILING POINT VOLATILE ORGANIC COMPOUNDS FROM AN EXHAUST

(75) Inventors: Hua-Ching Hsu; Ta-Tien Hsiang, both of Hsin-Chu (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/543,069

(22) Filed: Apr. 5, 2000

(51) Int. Cl.$^7$ ......................................... B01J 8/02
(52) U.S. Cl. ................... 423/245.1; 423/242.2; 423/243.01; 423/245.2
(58) Field of Search ............... 423/245.1, 242.2, 423/243.01, 245.2

(56) References Cited

U.S. PATENT DOCUMENTS 5,681,470 * 10/1997 Safi ..................................... 210/603
6,013,512 * 1/2000 Turschmid et al. ................. 435/266
6,164,813 * 12/2000 Wang .................................. 366/339

\* cited by examiner

Primary Examiner—Steven P. Griffin
Assistant Examiner—Maribel Medina
(74) Attorney, Agent, or Firm—Tung & Associates

(57) ABSTRACT

A method for removing high boiling point volatile organic compounds from an exhaust gas and an apparatus for performing such operation are described. In the method, a wet scrubber is provided which is equipped with a spent water reservoir at the bottom of the scrubber for collecting spent water that contains the volatile organic compounds dissolved in water used to wash the exhaust gas. An ozone gas at a preset concentration is then flown into the spent water to oxidize the dissolved volatile organic compounds contained in the water. The exhaust gas after being washed in the wet scrubber can be released to the atmosphere together with carbon dioxide generated in the oxidation reaction. In the apparatus, an ozone detector is further provided on the exhaust gas outlet in the wet scrubber chamber to verify a content of ozone in the released exhaust gas which is an indication that all the volatile organic compounds have been oxidized in the spent water reservoir. The present invention novel method and apparatus allow the removal of high boiling point, i.e. generally high than 180° C., volatile organic compounds by dissolving in the spent water and then oxidizing by ozone such that harmless carbon dioxide is released into the atmosphere.

12 Claims, 2 Drawing Sheets

| Gas | Formula | Molecular Wt. | Boiling Temp. °C | Gravity, g/ml |
|---|---|---|---|---|
| IPA | $C_3H_8O$ | 60.09 | 88.23 | 0.786 (@20°C) |
| Acetone | $C_3H_6O$ | 58.08 | 56.0 | 0.791 (@20°C) |
| DMSO | $C_2H_6SO$ | 78.13 | 189.0 | 1.01 (@20°C) |
| NMP | $C_5H_9NO$ | 99.13 | 202.0 | 1.027 (@20°C) |
| MEA | $C_2H_7NO$ | 61.08 | 171.0 | 1.022 (@20°C) |
| Dimethyl Sulfide | $C_2H_6S$ | 62.13 | 37.5 | --------- |
| Dimethyl Disulfide | $C_2H_6S_2$ | 94.19 | 108 | --------- |

| Unit: ppbv | #1 | #2 | #3 | #4 |
|---|---|---|---|---|
| DMSO | 9486 | 22450 | 20856 | 16718 |
| N,N-Dimethylacetamide | 240 | 321 | 250 | 180 |
| NMP | 499 | 576 | 536 | 762 |
| (CH3) 2S | 2256 | 6265 | 2861 | 3648 |
| (CH3)2S2 | 868 | 1863 | 1129 | 1459 |
| Toluene | 160 | 843 | 265 | 284 |
| Cyclopentanone | 75 | 79 | 62 | 71 |
| IPA | 1586 | 1017 | 1504 | 1648 |
| Acetone | 516 | 669 | 615 | 637 |

US 6,280,696 B1

METHOD AND APPARATUS FOR REMOVING HIGH BOILING POINT VOLATILE ORGANIC COMPOUNDS FROM AN EXHAUST

FIELD OF THE INVENTION

The present invention generally relates to a method and apparatus for treating an exhaust gas and more particularly, relates to a method and apparatus for treating an exhaust gas from a semiconductor fabrication machine by a wet scrubbing process wherein ozone gas is pumped into a spent water reservoir to caused an oxidation reaction of the volatile organic compounds dissolved in the spent water.

BACKGROUND OF THE INVENTION

In semiconductor fabrication processes, effluent or exhaust gas from a process chamber must be treated chemically or physically before they can be released into a factory exhaust system and subsequently into the atmosphere. A large number of reactant gases utilized in the semiconductor fabrication processes and their reaction products are either highly flammable, toxic or foul-smelling. Some of the spent reactant gases exhausted out of a process chamber may contain gases that have not been reacted or have been partially reacted and therefore must be chemically treated before they can be released into the atmosphere. Gas treatment units such as gas reactor columns are frequently used for such purpose of converting toxic gases into non-toxic gases.

While a gas reactor column can be a hot bed reactor that treats a wide variety of gases in a single cartridge without creating additional effluent disposal problems, a simpler method of treating exhaust gases is the use of an absorption unit that functions on the principle of gas absorption into a porous substance without chemical reactions taken place. This type of physical absorption process can be carried out by using a bed of porous substance such as activated carbon for absorbing certain components in exhaust gases. Specifically, those of low boiling temperature and of foul-smelling.

For instance, in the exhaust gas exiting a photoresist stripper chamber, various toxic and foul-smelling gases are present. Typically, a photoresist solvent of ACT®-690 is used in a photoresist stripper chamber. Various high boiling temperature gases such as dimethyl sulfoxide (DMSO, $C_2H_6SO$), N-methyl pyrolidone (NMP, $C_2H_9NO$), methyl ethyl alcohol (MEA, $C_2H_7NO$) and various foul-smelling gases such as dimethyl sulfide ($C_2H_6S$), dimethyl disulfide ($C_2H_6S_2$) and residual solvents such as isopropyl alcohol (IPA) and acetone are present in the exhaust gas. These major components are shown in FIG. 1. While the low boiling temperature gases, i.e., those having a boiling temperature of less than 100° C. such as dimethyl sulfide, dimethyl disulfide, IPA and acetone can be successfully removed by an absorption apparatus filled with activated carbon as the absorption substance, the high boiling temperature gases such as DMSO, NMP and MEA carimot be effectively removed in the absorption apparatus. The total percentage of toxic, high boiling temperature gases removed from the exhaust gas therefore is poor and unacceptable when the exhaust gas is only treated by an absorption apparatus.

The following examples 1~3 illustrate results of the photoresist stripper chamber exhaust gas being treated by a conventional absorption method.

EXAMPLE 1

The exhaust gas from a photoresist stripper chamber is treated which contains 8~200 ppm dimethyl sulfoxide, 21~250 ppm 2-aminoethanol, 1~20 ppm N-methyl pyrolidone, 21 ppm ethylene glycol, 0.5~10 ppm dithiolethylene glycol, 0.5~3 ppm dimethyl sulfide and 20~150 ppm isopropyl alcohol.

The flow rate of the exhaust gas exiting the chamber is 2,000~4,000 $m^3/hr$ which is kept at a temperature of about 45° C. The exhaust gas is first cooled by a coil-type cooling apparatus to approximately 14° C., and then fed directly into an absorption apparatus which contains activated carbon. The exhaust gas exiting the absorption apparatus was analyzed to show a removal efficiency of 70.1~78.3% at an energy usage rate of 72,000 k cal/hr. The efficiency is therefore not satisfactory since toxic components in the exhaust gas are allowed to escape into the atmosphere.

EXAMPLE 2

The content of the exhaust gas is similar to that shown in Example 1. The exhaust gas is directly fed to an absorption apparatus containing activated carbon for an absorption treatment. The exhaust gas exiting the absorption apparatus was determined at a removal efficiency of about 65.3~80.0%. However, foul-smell was detected after the absorption apparatus was used only for 3 days, and the activated carbon had to be replaced after 7 days due to excessive condensation in the carbon.

EXAMPLE 3

In this third example, as shown in FIG. 2, an absorption apparatus 10 is utilized which consists of an absorption wheel 12, a heat exchanger 14, a preheat furnace 16 and a burner 18. The VOC absorption 20 is first received from a semiconductor fabrication apparatus, which typically contains about 6.0 Kg/hr VOC exhaust at room temperature, the VOC exhaust 20 is fed into a rotating absorption wheel 12 to absorb the VOC content in the exhaust by activated elements such as aluminum oxide or molecular sieve. The treated exhaust gas is then divided into two exhaust gas flows 22, 24 at a ratio of flow volume at about 9:1. Therefore, a majority of the treated waste gas 22 which amounts to about 0.23 Kg/hr is released to the atmosphere. The smaller amount. i.e. about 10%, of the treated exhaust gas is then used for regeneration of the activate chemicals on the absorption wheel 12 by first combining with a high temperature gas through the heat exchanger 14 achieving a gas flow 26 having a temperature at about 180° C. The high temperature treated exhaust gas 26 is then flown into the absorption wheel 12 in an opposite direction to remove the VOC coated on the active absorption elements on the absorption wheel 12. A treated exhaust gas 28, which contains about 5.77 Kg/hr VOC then exits the absorption wheel 12 and is sent to a preheat furnace 16 for preheating and then into a burner 18 for burning of the VOC content. The high temperature exhaust gas 32 after the burner 18 achieve a temperature of about 760° C. is then sent into the preheat furnace 16 to supply heat to the furnace. After a heat exchanging process 34, the gas exits the preheat furnace 16 and enters the heat exchanger 14 for release into the atmosphere with a low VOC content of about 0.06 Kg/hr.

In the conventional setup in FIG. 2, the high temperature exhaust gas 26 sent from the heat exchanger 14 into the absorption wheel 12 frequently is not hot enough for removing the VOC content coated on the active elements in the wheel, particularly when difficult to remove VOC compounds such as DMSO, MEA and NMP are involved. Once the active elements on the absorption wheel 12 is covered with VOC, the absorption efficiency of the wheel is greatly reduced such that wheel 12 is no longer capable of absorbing VOC materials. The conventional absorption wheel apparatus 10 is therefore not efficient in treating exhaust gases that contain high boiling point volatile organic compounds.

It is therefore an object of the present invention to provide a method for removing high boiling volatile organic compounds from an exhaust gas that does not have the drawbacks or shortcomings or the conventional methods.

It is another object of the present invention to provide a method for removing high boiling point volatile organic compounds from an exhaust gas that does not require the use of an absorption apparatus.

It is a further object of the present invention to provide a method for removing high boiling point organic compounds from an exhaust gas that utilizes a wet scrubbing apparatus.

It is still another object of the present invention to provide a method for removing high boiling point organic compounds from an exhaust gas by treating spent water that contains volatile organic compounds by an oxidation agent.

It is another further object of the present invention to provide a method for removing high boiling point volatile organic compounds from an exhaust gas by using a wet scrubbing equipment and by treating spent water that contains volatile organic compounds with ozone.

It is yet another object of the present invention to provide a method for removing high boiling point volatile organic compounds from an exhaust gas by adding ozone to a spent water reservoir for conducting an oxidation reaction of the volatile organic compounds dissolved in the spent water and by adding a basic solution to the spent water to neutralize acids formed during the oxidation process.

It is still another further object of the present invention to provide a wet scrubber for removing high boiling point organic compounds from an exhaust gas which includes a spent water reservoir and a gas inlet into the reservoir for feeding a preset amount of ozone gas into the spent water to oxidize the volatile organic compounds dissolved in the water.

It is yet another further object of the present invention to provide a wet scrubber for removing high boiling point organic compounds from an exhaust gas which includes an ozone source for feeding ozone gas into a spent water reservoir and a basic solution dispenser for dispensing a basic solution into the spent water reservoir to neutralize acids produced during such oxidation process.

SUMMARY OF THE INVENTION

In accordance with the present invention, a method and an apparatus for removing high boiling point organic compounds from an exhaust gas are provided.

In a preferred embodiment, a method for removing high boiling point organic compound from an exhaust gas can be carried out by the operating steps of providing a wet scrubber that has a scrubber chamber and an exhaust gas inlet at a bottom half of the scrubber chamber and a water outlet at the top half of the scrubber chamber, flowing an exhaust gas that contains high boiling point volatile organic compounds into the scrubber through the exhaust gas inlet, flowing water into the water chambers through the water outlet and dissolving the high boiling point volatile organic compounds contained in the exhaust gas, collecting the water that contains the high boiling volatile organic compounds in a spent water reservoir positioned at a bottom of the scrubber, and flowing a preset amount of ozone into the spent water reservoir sufficient to oxidize the high boiling point volatile organic compounds.

The method for removing high boiling point volatile organic compounds from an exhaust gas may further include the step of adding a basic solution into the water flown through the water outlet such that the water exiting the water outlet has a pH value within the range of 7±1. The method may further include the step of feeding a NaOH solution into the water flown through the water outlet. The method may further include a step of flowing the preset amount of ozone in an ozone/air mixture containing at least 0.1 vol. % ozone, or the step of flowing the preset amount of ozone in an ozone/air mixture containing at least 1 vol. % ozone. The method may further include the step of flowing an exhaust gas containing at least one high boiling point volatile organic compounds selected from the group consisting of $C_2H_6SO$, $C_2H_6S_2$, $C_2H_6S_2$, $C_3H_8O$, $C_3H_6O$, $C_5H_9NO$ and $C_2H_7NO$.

The method for removing high boiling point volatile organic compounds from an exhaust gas may further include the processing step of flowing the exhaust gas containing high boiling point volatile organic compound upwardly through a packing medium of porous material that is washed by the water. The method may further include the step of flowing the exhaust gas after washed by the water out of the scrubber chamber through an exhaust gas outlet situated on top of the scrubber chamber. The method may further include the step of detecting an ozone content in the washed exhaust gas exiting an exhaust gas outlet situated on top of the scrubber chamber, or the step of increasing the preset amount of ozone flown into the spent water reservoir when no ozone is detect in the washed exhaust gas exiting an exhaust gas outlet situated on top of the scrubber chamber. The method may further include the step of mounting an ozone detector in fluid communication with an exhaust gas outlet situated on top of the scrubber chamber for detecting ozone content in the washed exhaust gas. The method may further include the step of spraying water into the scrubber chamber through the water outlet by pumping means.

The present invention is further directed to a wet scrubber for removing high boiling point volatile organic compound from an exhaust gas that includes a scrubber chamber of generally elongated, up-standing shape, a washed exhaust gas outlet situated in a top of the scrubber chamber. a water inlet situated juxtaposed to the top of the scrubber chamber, a packing medium of porous material positioned below the water inlet, a spent water reservoir at a bottom of the scrubber chamber for collecting spent water therein, an exhaust gas inlet through a side wall of the scrubber chamber situated between the spent water reservoir and the packing medium, a pump means for pumping water through the water inlet, and a gas inlet in the spent water reservoir for feeding a preset amount of ozone gas into the spent water and for oxidizing the high boiling point volatile organic compound contained in the spent water.

The wet scrubber for removing high boiling point volatile organic compound from an exhaust may further include an ozone detector mounted on and in fluid communication with the washed exhaust gas outlet for detecting any ozone content in the washed exhaust gas. The wet scrubber may further include a water spray head in the water inlet for spraying water onto the packing medium of porous material. The wet scrubber may further include a basic solution dispenser for dispensing a basic solution into the water inlet such that a pH value of the water is adjusted to a value within the range of 7±1. The wet scrubber may further include a pHl meter for monitoring a pH value of a spent water in a controller for determining an amount of a basic solution to be dispensed in order to maintain a pH value within the range of 7±1. The preset amount of ozone gas fed into the spent water is an air/ozone mixture that contains at least 0.1 vol. % ozone. The basic solution dispensed into the water inlet may be a NaOH solution. The high boiling point volatile organic compound is at least one member of the group consisting of $C_2H_6SO$, $C_2H_6S$, $C_2H_6S_2$, $C_3H_8O$, $C_3H_6O$, $C_5H_9NO$ and $C_2H_7NO$.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a method and an apparatus for removing high boiling point volatile organic compounds from an exhaust gas exiting a fabrication equipment. While the present invention novel method and apparatus can be used for any type of fabrication equipment, it is particularly suited for use in connection with a semiconductor fabrication machine that emits exhaust gas that contains high boiling point volatile organic compounds. For instance, the exhaust gas from a photoresist stripping operation which frequently contains a large amount of volatile organic compounds such as NMP, DMSO, MEA, etc.

In an exhaust gas exiting a photoresist stripping chamber that utilizes a commercial photoresist stripping chemical of ACT®-690, various high melting temperature oases such as DMSO, NMP and MEA are contained. While lower boiling temperature gases, i.e. those which have a boiling temperature less than 100° C. such as dimethyl sulfide, disulfide, IPA and acetone, can be successfully removed by an absorption apparatus filled with activated carbon as the absorption substance, the high boiling temperature gases such as those named above cannot be effectively removed by the absorption apparatus.

The present invention novel method and apparatus provide a wet scrubber in which water soluble high boiling temperature volatile organic compounds can be washed or dissolved from the exhaust gas into a spent water reservoir situated at a bottom of the wet scrubber. The volatile organic compounds contain in the spent water is then oxidize into harmless carbon dioxide by pumping ozone gas into the spent water. The carbon dioxide gas can then be safely released into the atmosphere. Inside the wet scrubber, the water contacts the exhaust gas for a time period of about 0.3 seconds when a packing medium of porous material is utilized. A suitable ozone gas may be a by-product from a chemical vapor deposition process which has a purity of about 90%. The various high boiling temperature volatile organic compounds such as NMP, dimethyl sulfoxide and monothanolamine can be oxidized readily by the following representative reactions:

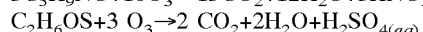
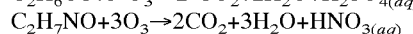

a by-product of acid is normally produced in the oxidation reaction which renders the spent water acidic. As a result, if not treated, the acidic spent water may cause corrosion to the wet scrubber apparatus. It is therefore desirable, depending on the degree of acidity, to add a basic solution fed from a basic solution storage tank for adjusting the pH value of the spent water. A suitable pH value to be adjusted to my be in the range between about 6 and 8 or $7\pm1$.

Figures 1, 2:
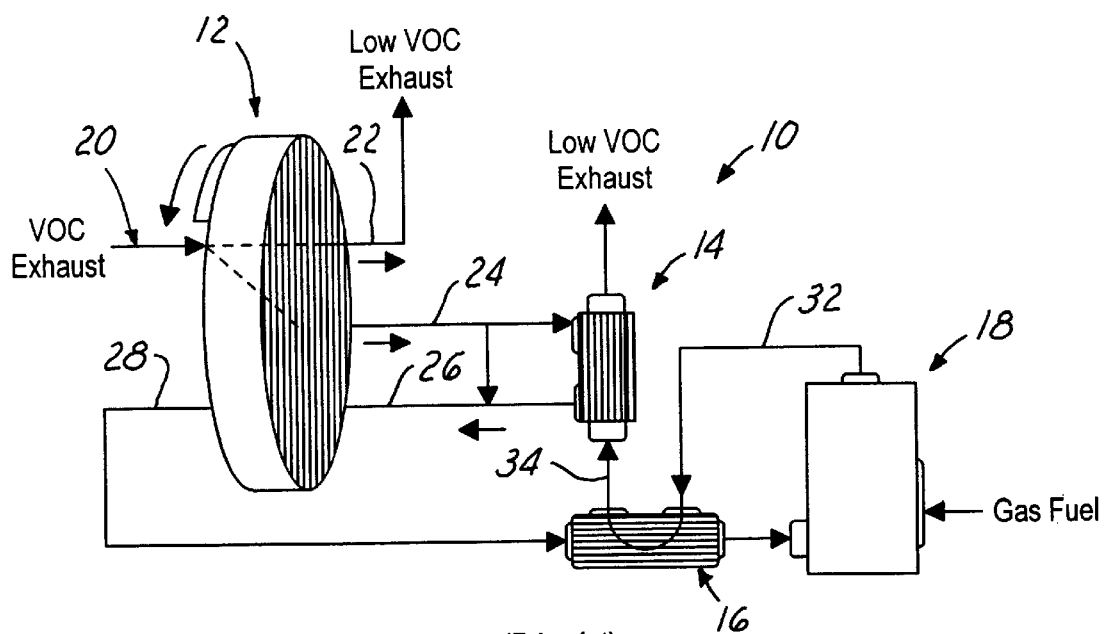
FIG. 1 is a chart illustrating the major chemical components of a photoresist stripper solution of ACT®-690.
FIG. 2 is an illustration of a conventional absorption apparatus for treating an exhaust gas that contains high boiling point volatile organic compounds by an absorbing wheel and a heat exchanger.
Figures 3, 4:
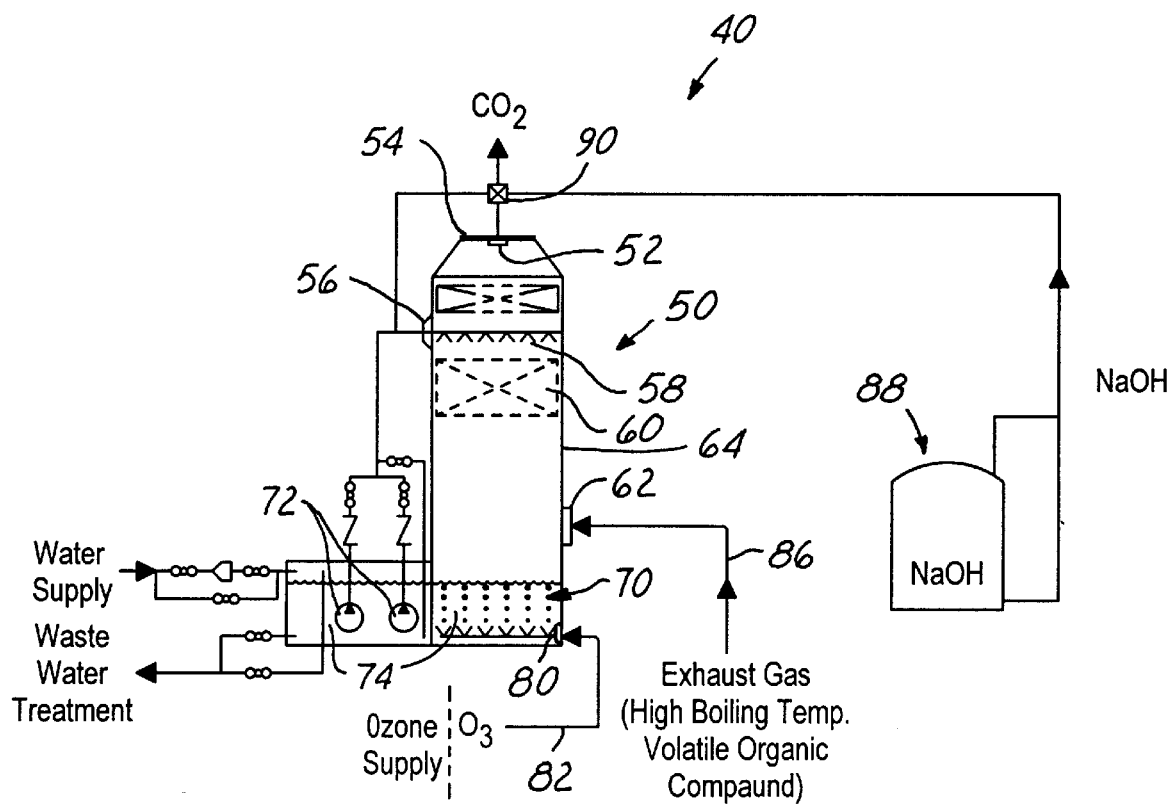
FIG. 3 is an illustration of the present invention wet scrubber for treating exhaust gas with high boiling point volatile organic compounds that includes ozone treatment in the spent water reservoir.
FIG. 4 is a chart illustrating the incoming VOC gas content used in the present invention wet scrubber/ozone treatment apparatus.

A present invention apparatus 40 is shown in FIG. 3. The apparatus 40 consists mainly of a wet scrubber chamber 50 formed generally of an elongated, up-standing shape. The scrubber chamber 50 includes a washed exhaust gas outlet 52 situated in a top 54 of the scrubber chamber 50. The scrubber chamber 50 further includes a water inlet 56 situated juxtaposed to the top 54 of the scrubber chamber and is normally provided with a series of spray heads 58 for spraying water therefrom. A packing medium 60 formed of a porous material is positioned under the water sprayer heads 58 such that the contact time between the exhaust gas and water may be optimized, or prolonged. A spent water reservoir 70 for holding spent water therein is provided at the bottom of the scrubber chamber 50 for collecting spent water. An exhaust gas inlet 62 is further provided through a sidewall 64 of the scrubber chamber 50 situated between the spent water reservoir 70 and the packing medium 60. A pump means 72 is further provided for pumping water 74 through the water inlet 56 allowing the water to spray from the spraying heads 58. A gas inlet 80 into the spent water reservoir 70 feeds a preset amount of ozone gas 82 into the spent water 74 for oxidizing the high boiling point volatile organic compounds contained in the spent water 74.

The wet scrubber chamber 50 may further include an ozone detector 90 mounted on and in fluid communication with the washed exhaust gas outlet 52 for detecting any ozone content in the washed exhaust gas. It has been found that for each 0.01 vol. % ozone, 10,000 ppm of volatile organic compounds can be oxidized. Since the exhaust gas 86 that enters the wet scrubber chamber 50 containing high boiling temperature volatile organic compounds normally contains 200 ppm of the compounds, an amount of ozone that is adequate to oxidize 1,000 ppm of the volatile organic compounds should be more than adequate. In other words, a 0.1 vol. % of ozone in an air/ozone mixture should be adequate for oxidizing all the volatile organic compounds contained in the spent water 74. A suitable source of ozone in a semiconductor fabrication facility is from a chemical vapor deposition process which normally contains 12 vol. % of ozone, i.e. provided in a 12% ozone/88% air mixture. At such ozone concentration, it is believed that all the volatile organic compounds contained in an exhaust gas are completely oxidized. Typical compositions of the volatile organic compounds contained in an exhaust gas from four separate tests utilized in the present invention method is shown in FIG. 4.

The present invention novel apparatus 40 further consists of a basic solution dispenser 88 for dispensing a basic solution, such as NaOH into the water inlet 56 such that a pH value of water 74 can be adjusted within the range of $7\pm1$. The wet scrubber chamber 50 may further include a pH meter (not shown) for monitoring a pH value of the spent water 74 and a controller (not shown) for determining the amount of a basic solution to be added to maintain a pH value in the range of $7\pm1$. A suitable basic solution dispensed into the water inlet may be a NaOH solution at any suitable concentration.

The present invention novel method and apparatus for removing high boiling point volatile organic compounds from an exhaust gas have therefore been amply described in the above description and in the appended drawings of FIGS. 3 and 4.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows:

What is claimed is:

1. A method for removing a high boiling point volatile organic compound from an exhaust gas comprising the steps of:
   providing a wet scrubber having a scrubber chamber, an exhaust gas inlet in a first half of the scrubber chamber and a water outlet in a second half of the scrubber chamber,
   flowing an exhaust gas containing a high boiling point volatile organic compound into said scrubber through said exhaust gas inlet,
   flowing water into said scrubber chamber through said water outlet and dissolving said high boiling point volatile organic compound contained in said exhaust gas,
   collecting said water containing said high boiling point volatile organic compound in a spent water reservoir, and
   flowing a preset amount of ozone into said spent water reservoir sufficient to oxidize said high boiling point volatile organic compound.

2. A method for removing a high boiling point volatile organic compound from an exhaust gas according to claim 1 further comprising the step of adding a basic solution into said water flown through said water outlet such that water exiting said water outlet has a pH value within the range of 7±1.

3. A method for removing a high boiling point volatile organic compound from an exhaust gas according to claim 1 further comprising the step of adding a NaOH solution into said water flown through said water outlet.

4. A method for removing a high boiling point volatile organic compound from an exhaust gas according to claim 1 further comprising the step of flowing said preset amount of ozone in an ozone/air mixture containing at least 0.1 vol. % ozone.

5. A method for removing a high boiling point volatile organic compound from an exhaust gas according to claim 1 further comprising the step of flowing said preset amount of ozone in an ozone/air mixture containing at least 1 vol. % ozone.

6. A method for removing a high boiling point volatile organic compound from an exhaust gas according to claim 1 further comprising the step of flowing an exhaust gas containing at least one high boiling point volatile organic compound selected from the group consisting of $C_2H_6SO$, $C_2H_6S_2$, $C_2H_6S_2$, $C_3H_8O$, $C_3H_6O$, $C_5H_9NO$ and $C_2H_7NO$.

7. A method for removing a high boiling point volatile organic compound from an exhaust gas according to claim 1 further comprising the step of flowing said exhaust gas containing a high boiling point volatile organic compound upwardly through a packing medium of porous material that is washed by said water.

8. A method for removing a high boiling point volatile organic compound from an exhaust gas according to claim 1 further comprising the step of flowing said exhaust gas after washed by said water out of said scrubber chamber through an exhaust gas outlet situated on top of said scrubber chamber.

9. A method for removing a high boiling point volatile organic compound from an exhaust gas according to claim 1 further comprising the step of detecting an ozone content in said washed exhaust gas exiting an exhaust gas outlet situated on top of said scrubber chamber.

10. A method for removing a high boiling point volatile organic compound from an exhaust gas according to claim 1 further comprising the step of increasing said preset amount of ozone flown into said spent water reservoir when no ozone is detected in said washed exhaust gas exiting an exhaust gas outlet situated on top of said scrubber chamber.

11. A method for removing a high boiling point volatile organic compound from an exhaust gas according to claim 1 further comprising the step of mounting an ozone detector in fluid communication with an exhaust gas outlet situated on top of said scrubber chamber for detecting ozone content in said washed exhaust gas.

12. A method for removing a high boiling point volatile organic compound from an exhaust gas according to claim 1 further comprising the step of spraying said water into said scrubber chamber through said water outlet by pumping means.

* * * * *